United States Patent [19]

Mangiavacchi

[11] Patent Number: 4,710,150

[45] Date of Patent: Dec. 1, 1987

[54] SEALING DEVICE FOR A UNIVERSAL JOINT

[75] Inventor: Jacques Mangiavacchi, Chatou, France

[73] Assignee: Glaenzer Spicer, Poissy, France

[21] Appl. No.: 743,965

[22] Filed: Jun. 12, 1985

[30] Foreign Application Priority Data

Jun. 15, 1984 [FR] France .................................. 84 09451

[51] Int. Cl.$^4$ .............................................. F16D 3/84
[52] U.S. Cl. ........................................ 464/14; 277/95;
  277/152; 277/183; 384/486; 464/131
[58] Field of Search ........................... 464/11, 14, 131;
  277/95, 152, 183, 184; 384/484, 486

[56] References Cited

U.S. PATENT DOCUMENTS

| 2,773,366 | 12/1956 | Slaght | 464/131 |
| 3,581,524 | 6/1971 | Pitner | 464/131 |
| 3,846,995 | 11/1974 | Mangiavacchi | 464/131 |

FOREIGN PATENT DOCUMENTS

| 1195688 | 11/1959 | France. | |
| 1481276 | 5/1967 | France. | |
| 2063718 | 7/1971 | France. | |
| 2121937 | 8/1972 | France. | |
| 2526509 | 11/1983 | France. | |
| 802491 | 10/1958 | United Kingdom. | |
| 861112 | 2/1961 | United Kingdom. | |
| 2112876 | 7/1983 | United Kingdom | 464/14 |

Primary Examiner—Stuart S. Levy
Assistant Examiner—Daniel P. Stodola
Attorney, Agent, or Firm—Wenderoth, Lind & Ponack

[57] ABSTRACT

A sealing device for a universal joint comprising an annular cup surrounding each branch of a spider element of the universal joint and fixed with a bearing ring capping the end of the associated branch. A flexible sealing element having lips on the periphery thereof is engaged with an inner circular flange of the annular cup. According to the invention, the annular cup comprises a cylindrical skirt mounted to bear against a flange of the corresponding branch of the spider element, the skirt extending in a direction substantially perpendicular to the circular flange of the annular cup. This arrangement reduces the interference between the annular cup and the flexible sealing element, which is composed of rubber, to thereby increase the effectiveness of the seal afforded by the device.

4 Claims, 1 Drawing Figure

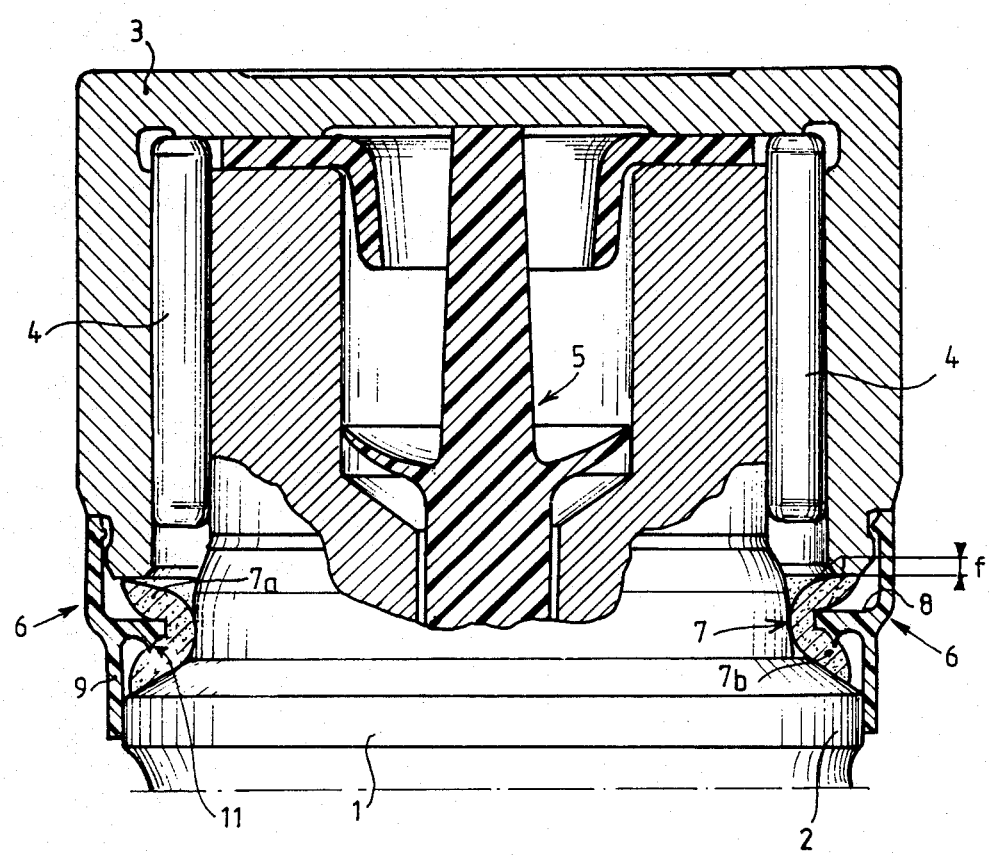

SEALING DEVICE FOR A UNIVERSAL JOINT

The present invention relates to a sealing device for a universal joint comprising an annular cup surrounding each branch of a spider element of the joint and connected to a bearing ring capping the end of the associated branch, and a flexible sealing element having lips on the periphery of which there is engaged an inner circular flange of the cup.

A sealing device of this type has been disclosed in French patent No. 72 16142. Such a sealing system provides an effective protection of the bearings, but experience has shown that it is possible to improve the seal thus provided by permanently connecting the flexible sealing element having lips with each branch of the spider element (or trunnion).

For this purpose, various solutions have been envisaged.

It has first of all been proposed to adhere together the flexible sealing element having lips (usually composed of rubber), the spider element and the bearing cup. Such a solution is difficult to produce industrially owing to the use of adhesive so that it had to be abandoned.

It was then envisaged to mold the sealing element having lips on a modified bearing cup provided with anchoring means, for example in the form of teeth in a mold in which said bearing cup is inserted. Such a device would permit the interconnection of the bearing cup and the flexible sealing element but not that between the assembly of these two elements and the trunnion. This solution has also been found to be technically difficult to construct and to be of a prohibitive cost.

It was then imagined to construct the bearing cup not of a plastics material as is usually the case but of steel and to bond, that is to say to adhere, the rubber of the sealing element, to this bearing cup. In this way, the sealing element is gripped to a greater extent and it is ensured that the sealing element does not slide during the assembly. Unfortunately, this solution has the drawback of being extremely costly. Further, it results in rust on the bearing cup and the seal between the steel of the latter and that of the bearing cup is moreover of doubtful quality.

An object of the invention is therefore to provide a device affording a seal which is improved over that obtained with the known arrangements, this device being relatively simple to produce on an industrial scale and of low price.

According to the invention, the cup comprises a skirt which is preferably cylindrical and caps with a gripping effect a flange of the corresponding branch of the spider element, said skirt extending in a direction substantially perpendicular to an inner circular flange of the cup.

The presence of this skirt permits a decrease in the gripping effect exerted on the sealing element by the inner flange of the cup and therefore limits the deformation of the sealing element having lips occurring upon assembly and consequently the reduction in the deflection of the sealing element having lips and the "rating" of the seal, i.e. the pressure beyond which the lubricant escapes from the interior of the bearing cup. On the other hand, the skirt permits a transfer to the flange of the corresponding branch of the spider element of an additional maintenance of the cup as concerns rotation which provides a more effective seal while it permits a reduction in the interference between the sealing element having lips and the inner flange of the cup, i.e. the extent of overlapping between these two parts.

There is thus obtained a more satisfactory mounting of the sealing element having lips, the prescribed deflections of which may be conformed to (the deflection of the sealing element being defined by the difference between the levels of the lips in the free state and in the stressed state produced by the bearing after assembly).

BRIEF DESCRIPTION OF THE DRAWING

Other features and advantages of the invention will be apparent from the following description with reference to the accompanying single FIGURE which illustrates one embodiment by way of a non-limiting example.

The FIGURE is an axial sectional view to an enlarged scale of a branch of a spider element of a universal joint provided with a sealing device according to the invention.

DETAILED DESCRIPTION

The universal joint partly shown in the drawing comprises a spider element having four branches 1, only one of which has been shown. This branch has, in the vicinity of its end, a circular flange 2 and is capped by a bearing ring 3 with interposition of a ring arrangement of needle bearings 4. Each spider element is provided with an axial passageway filled with lubricant and communicating with the cavity for the needle bearings 4, a lubricant retaining element 5 which is conventional being disposed inside each branch 1. In operation, the bearing ring 3 undergoes an alternating (oscillating) movement of rotation relative to the trunnion 1. The device provided for affording a seal between each branch 1 of the spider element and the corresponding bearing ring 3 comprises an annular cup 6 surrounding each branch 1, and a flexible sealing element 7 which is usually made from rubber and includes a V-shaped annular recess between lips 7a, 7b applied around the branch 1 between the flange 2 and the bearing ring 3.

The cup 6 is provided with an inner circular flange 8 radially engaged with the periphery of the sealing element 7 in the V-shaped annular recess between the lips 7a, 7b of which it is engaged.

According to the invention, the cup 6 comprises a skirt 9 which perferably has a cylindrical inner surface which caps with a gripping effect by its base the flange 2 of the corresponding branch 1 of the spider element. This skirt 9 extends in a direction substantially perpendicular to the general plane of the inner circular flange 8 and is therefore parallel to the axis of the branch 1. Further, means are provided for fixing the sealing element 7 to the cup 6, namely, in the presently-described embodiment, points or lugs 11 extend perpendicularly from a surface of the inner flange 8 and are embedded in the rubber of the sealing element 7.

The technical effect of this sealing device is the following:

Owing to its gripping effect on the flange 2 and to the lugs 11, the skirt 9 positively prevents any rotation of the sealing element 7 having lips 7a, 7b with respect to the branch 1 of the spider element.

Consequently, the lip 7b of the sealing element 7 will only have to ensure a static sealing which is moreover reinforced by the presence of the skirt 9, which itself constitutes additional barrier against the introduction of foreign bodies carried along by the centrifugal force produced by the rotation of the joint.

The dynamic seal, i.e. with rotation of the sealing element 7 relative to the bearing ring 3, is solely and preferentially ensured by the lip 7a, to which the centrifugal force produced by the rotation of the joint will add an additional pressure for retaining the lubricant to that produced by the deflection "f" of the lip 7a of the sealing element 7 when mounting the bearing ring 3.

Further, this fixing of the sealing element 7 by the skirt 9 dispenses with the requirement to obtain an additional fixing by an excessive gripping of the sealing element 7 between the branch 1 and the inner flange 8. This enables the considerable parasitic deformations of the sealing element 7 to be eliminated, which deformations could be produced during its mounting on the trunnion 1 and which do not favor a good dynamic seal.

A substantially improved seal relative to that produced by the known prior art devices is thus obtained. The cup 6 may be made from any suitable plastics material, for example from "Nylon" or "Delrin" (registered trade marks).

What is claimed is:

1. A sealing device for a universal joint comprising:
   spider element branches, each of said spider element branches having an outer flange;
   an annular cup, surrounding each of said spider element branches, having a circular inner flange extending radially inward from an inner surface thereof and having a skirt extending perpendicularly from said circular inner flange which caps said outer flange of a corresponding one of said spider element branches with a gripping effect;
   a bearing ring capping an end of each of said spider element branches, said bearing ring being connected to said annular cup;
   a flexible sealing element disposed around said corresponding spider element branch and providing a dynamic seal with said bearing ring, said flexible sealing element having an annular recess between a pair of lips, said circular inner flange of said annular cup being received in said annular recess and engaged with said pair of lips of said flexible sealing element; and
   means for fixing said flexible sealing element to said circular inner flange of said annular cup to prevent rotation of said flexible sealing element with respect to said annular cup;
   whereby said gripping effect exerted by said skirt results in a reduction in deflection and deformation of said flexible sealing element.

2. The sealing device of claim 1, wherein said skirt has a cylindrical inner surface.

3. The sealing element of claim 1, wherein said fixing means comprise lugs on said annular cup.

4. The sealing element of claim 3, wherein said lugs extend perpendicularly from said circular inner flange of said annular cup.

* * * * *